United States Patent
Agari

[19]

[11] Patent Number: 6,106,154
[45] Date of Patent: Aug. 22, 2000

[54] LINEAR MOTION GUIDE UNIT

[75] Inventor: Norimasa Agari, Gifu-ken, Japan

[73] Assignee: Nippon Thompson Co., Ltd., Tokyo, Japan

[21] Appl. No.: 09/275,406

[22] Filed: Mar. 24, 1999

[30] Foreign Application Priority Data

Mar. 27, 1998 [JP] Japan .................................. 10-098143

[51] Int. Cl.$^7$ .................................................. F16C 29/06
[52] U.S. Cl. .............................................. 384/15; 384/13
[58] Field of Search .................. 384/15, 1 C, 43, 384/44, 45

[56] References Cited

U.S. PATENT DOCUMENTS

| | | | |
|---|---|---|---|
| Re. 35,323 | 9/1996 | Ohtake | 384/15 |
| 4,927,272 | 5/1990 | Ward, Jr. | 384/15 X |
| 5,324,116 | 6/1994 | Agari | 384/15 |
| 5,435,649 | 7/1995 | Kuwahara | 384/15 X |
| 5,590,965 | 1/1997 | Yabe et al. | 384/15 |
| 5,769,543 | 6/1998 | Tsukada et al. | 384/15 |

FOREIGN PATENT DOCUMENTS

| | | |
|---|---|---|
| 6-051547 | 7/1994 | Japan . |
| 6-051548 | 7/1994 | Japan . |
| 9-264322 | 10/1997 | Japan . |

*Primary Examiner*—Charles A Marmor
*Assistant Examiner*—Saúl Rodriguez
*Attorney, Agent, or Firm*—Browdy And Neimark

[57] ABSTRACT

A linear motion guide unit is disclosed wherein the end seals may be simply attached and/or detached from the end surfaces of the end caps to deal with the miniaturization. The end caps are provided on the end surfaces thereof with protuberances while the end seals are formed with perforations in correspondence with the protuberances. The protuberances each are of a rectangular contour in plan view and have jaws on its widthwise-opposing sides. The jaws may make engagement with stopper edges formed along the perforations. The end seals may be mounted onto the end surfaces of the end caps by simply forcing the end seals against the end caps, thereby making engagement of the protuberances with the perforations.

12 Claims, 8 Drawing Sheets

LINEAR MOTION GUIDE UNIT

BACKGROUND OF THE INVENTION

1. Field of the Invention

The present invention relates to a linear motion guide unit composed of a sliding element straddling and movable along a track rail in a sliding manner.

2. Description of the Prior Art

Conventionally linear motion guide units shown in FIGS. 13 to 22 are well known to those skilled in the art.

Most prior linear motion guide units, as shown in FIGS. 13 to 22, each comprises a track rail 2 having opposing lengthwise side surfaces 3 on which are formed raceway grooves 4, and a sliding element, or slider 30, saddling the track rail 2 so as to freely move along and with respect to the track rail through rolling elements 5. The slider 30 is composed of a casing 9 formed with raceway grooves 8 confronting the raceway grooves 4 of the track rail 2, rolling elements, or rollers 5, running through raceways defined between the confronting raceway grooves 4, 8 so as to permit the slider to move relatively to the track rail, end caps 31 arranged on the end surfaces opposing in the moving direction of the casing 9 or lengthwise, one to each end surface, end seals 32 secured on the end caps 31 so as to close clearances between the track rail 2 and the end caps 31, and bottom seals 11 arranged on the lower surfaces of the casing 9 and the end caps 31 so as to close clearances between the track rail 2 and both the casing 9 and end caps 31. The casing 9 is further formed with threaded openings 34 for attaching thereto a table and other appliances, parts or the like by screws.

The slider 30 is movable in a straddling attitude along the track rail 2 through rolling elements 5, which may run in a circulating manner through the raceways defined between the raceway grooves 4, 8, turnarounds 14 (refer to FIG. 21) in the end caps 31 and return passages 13 bored in the casing 9. Provided on the end surfaces of the end seals 32 and the side surfaces of the end caps 31 are grease nipples 35 for supplying lubricant to the sliding interfaces between the raceways and the rolling elements 5.

The end seals 32 are each comprised of a core plate 21 of metals such as steal or the like, an elastic sealing member 22 of synthetic rubbers, synthetic resins or the like secured to the core plate 21. Upon having mounting any end seal 32 on its associated end cap 31, a lip 24 of the sealing member 22 may make tight contact with the lengthwise side surfaces of the truck rail 2 so as to close the clearances between the track rail 2 and the end caps 31.

Screws are available for mounting the end seals 32 onto the end caps 31. The end seals 32 have been usually secured on the end surfaces of the casing 9 through the screws 36 together with the end caps 31. As an alternative, following screwing the end caps 31 on the end surfaces of the casing 9, the end seals 32 have been secured on the end caps 31 with the other screws.

On the prior linear motion guide unit having the end seals 32 screwed on the casing 9, attachment and/or detachment of the bottom seals has been troublesome in need of repair and replacement of the end seals. Moreover, the screws are often limited in their permissible locations so that, in some cases, it is hard to help ensure the reliable fixing of the seal ends. This has caused a major problem of deterioration in sealing performance. In case of screwing the end seals 32 on the ends of the casing 9 together with the end caps 31, the positioning error is liable to happen in matching of the end seals 32 with the track rail 2 and end caps 31 owing to the scattering in boring precision of the fitting openings 28, 39 of the end caps 31 and end seals 32. In contrast, on an alternative where the end seals 32, after having screwed the end caps 31 on the ends of the casing 9, are secured on the end caps 31 with the other screws, extra spaces for boring additional openings in the end caps 31 are required and, therefore, adverse the recently increasing requirement for miniaturization of the linear motion guide units.

There have been also known the mounting structures of the end seals onto the slider, in which the end seals are mounted to the bottom seals with the engagement with the latter. Disclosed in Japanese Utility Model Laid-Open Nos. 51547/1994 and 51548/1994 are examples of the mounting structure of the end seals to the bottom seals, in which the end seal has protrusions while the bottom seal has the complementary recesses whereby the engagement of the protrusions with the recesses results in securing the end seal to the bottom seal.

The slider has been alternatively known wherein the end seals are mounted in a snapping manner on a frame body of hollow rectangular in section, which is composed of end plates and side plates and incorporated with the casing and end caps. In the prior art, the end seal is produced by the injection molding of synthetic resins or synthetic rubbers and comprised of platy members abutted against the frame body, sealing members making contact with the track rail, and snap fasteners extending outwardly from the back sides of the platy members. On the other hand, the frame body is formed with perforations in its end plates while the end caps have openings in alignment with the perforations. The end seals may be thus secured to the casing with the fitting engagement of the snap fasteners into the perforations of the frame body and the openings in the end caps. Japanese Patent Laid-Open No. 264322/1997 discloses an example of the prior art described just above.

Nevertheless, the prior slider of the type in which end caps, casing and end seals are all incorporated in the frame body becomes inevitably complicated and large-sized in structure and therefore does no deal with the recent need of miniaturization. That is to say, as the end seal integral with the snap fasteners has required a greater strength on snap-fitting the fasteners into the perforations and the openings, the end seal has to be rendered larger in thickness, resulting in making the slider longer and thus disadvantageous to the miniaturization of the motion guide units.

SUMMARY OF THE INVENTION

The present invention has for its primary object to overcome the shortcomings as described above with reference to the prior art, and to provide a linear motion guide unit capable of dealing with the miniaturization, more particularly, an improvement in the sliding element, or the slider, in which end seals are each formed with perforations that are to be engaged with complementary protuberances on its associated end cap in a snap-fitting manner, whereby the end seals in need of their repair and replacement may be detached from and/or attached to the end caps with easy and speedy processing and further the positional alignment of the end seal with the end cap may be accomplished even without any high finishing precision on the parts.

The present invention is concerned with a linear motion guide unit comprising: a track rail having first raceway surfaces on its lengthwise side surfaces and a sliding element saddling the track rail for a sliding movement with respect to the track rail; the sliding element including a casing having second raceway surfaces confronting the first raceway surfaces of the track rail, end caps mounted on the casing at opposing ends lengthwise the casing, rolling elements along raceways defined between the first and second raceway surfaces, and end seals arranged on end surfaces of the end caps; the end caps being provided on the end surfaces thereof with protuberances; and the end seals being composed of core plates formed with perforations to make engagement with the protuberances of the end caps, and sealing members adhered to the core plates so as to close clearances between the track rail and the end caps.

In an aspect of the present invention, the protuberances on the end caps are each formed extending vertically of the end caps at its lengthwise direction. As an alternative, the protuberances on the end caps are each formed extending horizontally of the end caps at its lengthwise direction. In the description hereinafter, the "vertical direction" means the direction perpendicular to the railhead of the track rail, that is to say, the direction perpendicular to the plane including the a pair of the raceway surfaces on the track rail while the "horizontal direction" is referred to the direction parallel with the railhead of the track rail, that is to say, the direction parallel with the plane including the a pair of the raceway surfaces on the track rail.

In another aspect of the present invention, the desired number of the protuberances are formed on the end caps while the perforations are arranged in correspondence to the protuberances, whereby the end seals may be reliably secured to the end caps with no fear of deteriorating the sealing performance. It is preferred that at least four of the protuberances are arranged spaced apart vertically and horizontally form each other on the end caps.

In another aspect of the present invention, the perforations in the end seals are made greater in lengthwise direction than the protuberances on the end caps for easy positional alignment of the end seals to the end caps. This makes it possible to finely regulate the mounting position of the end seal to the associated end cap with tolerance for the finishing errors that might occur on formation of the protuberances on the end caps and perforation in the end seals.

In another aspect of the present invention, the core plates of the end seals are provided with elastic projections that are brought into elastic abutment against the end surfaces of the end caps. Upon the protuberances on the end caps made in engagement with the perforations in the end seals, the projections the end seals are forced so as to space apart from the associated end caps by the reaction force of the elastic projections so that the jaws of the protuberances on the end caps are held in the resiliently engagement with the stopper edges formed around perforations in core plates of the end seals, thus making it possible to help ensure the reliable positioning of the end seals against the end caps.

In a further another aspect of the present invention, the protuberances on the end caps are made of a material identical with that of the end caps and formed integral with the end caps.

In another aspect of the present invention, the protuberances on the end caps have jaws that are made into resilient engagement with stopper edges formed along peripheries of the perforations in the end seals. When the protuberances are made of a material resistant to the elastic deformation, it is very hard to fit the jaws into the perforations because the jaws are made greater in the widthwise span than a spacing between the confronting stopper edges. To cope with this, it is preferred that the protuberances have the structure of making resilient deformation easier under pressure.

In another aspect of the present invention, it is preferred that the protuberances on the end caps are partially cut away along lengthwise direction to be made reduced in widthwise thickness. As an alternative, the protuberances on the end caps are split lengthwise in a forked configuration rendering the elastic deformation easier. Each protuberance may be alternatively from inverted L-shaped pieces.

In a further another aspect of the present invention, the protuberances on the end caps may be each made thicker in width along its upper half, compared with the residual lower half.

In another aspect of the present invention, the perforations in the end seals are provided with elastic members to close clearances between the perforations and the protuberances. The elastic members arranged in the perforations may close the clearances around the protuberances. Consequently, the clearances are kept from the contamination with dust and dirt. In addition, the modification in arrangement of the elastic sealing hems closing the clearances between the perforations and the protuberances results in adjusting the spacing between the track rail and end seals, that is, regulating the pre-stress that is to be applied to the lips of the end seals, which are made sliding contact with the rail head of the track rail.

In the linear motion guide unit constructed as descrived just abov, end seals may be attached and/or detached to the end caps, which have been mounted to the casing, by simply engaging the protuberances with the perforations. Hence the linear motion guide unit of the present invention is less in number of parts, simple in structure, short in whole length, adapted to deal with the miniaturization, and easy and efficient in attachment and/or detachment in need of replacement of the end seals. The protuberances may be formed integrally with the end caps while the perforations in the end seals may be formed by simply punching the core plates.

Further, the linear motion guide unit of the present invention has no need of forming additional holes for inserting screws into the end caps, resulting in becoming more compact in space and thus coping with the recent trend towards miniaturization.

In accordance with the linear motion guide unit of the present invention in which the end seals are attached to the end caps that have been secured to the casing with screws or the like, the end seals may be aligned or positioned with more accuracy, compared with the prior unit in which the end seals are attached to the casing together with the end caps. Especially, by making the perforations greater in lengthwise direction than the length of the protuberances, the end seals may be adjusted in positioning along the lengthwise direction. This makes it possible to allow the finishing errors, resulting in reducing the requirements in finishing accuracy.

Moreover, the core plate of the end seal is provided with elastic projections, which are arranged near the perforations. Upon the protuberances on the end caps having been fitted in the perforations in the end seals, the projections are kept in a press-contact with the associated end of the end caps. Consequently, the end seals are forced so as to space apart from the associated end caps by the reaction force of the elastic projections so that the jaws of the protuberances on the end caps are held in the resiliently engagement with the stopper edges formed around perforations in core plate of the end seals, thus making it possible to help ensure the reliable positioning of the end seals against the end.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
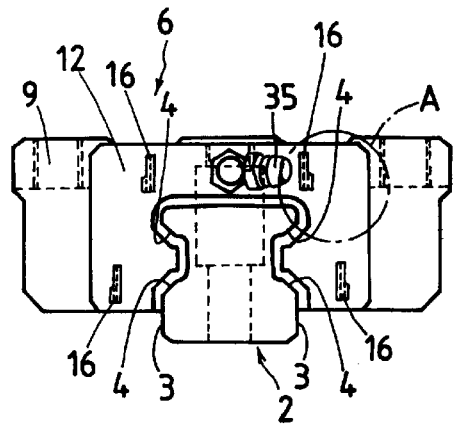
FIG. 1 is a front elevation view showing a preferred embodiment of a linear motion guide unit according to the present invention.
Figure 2:
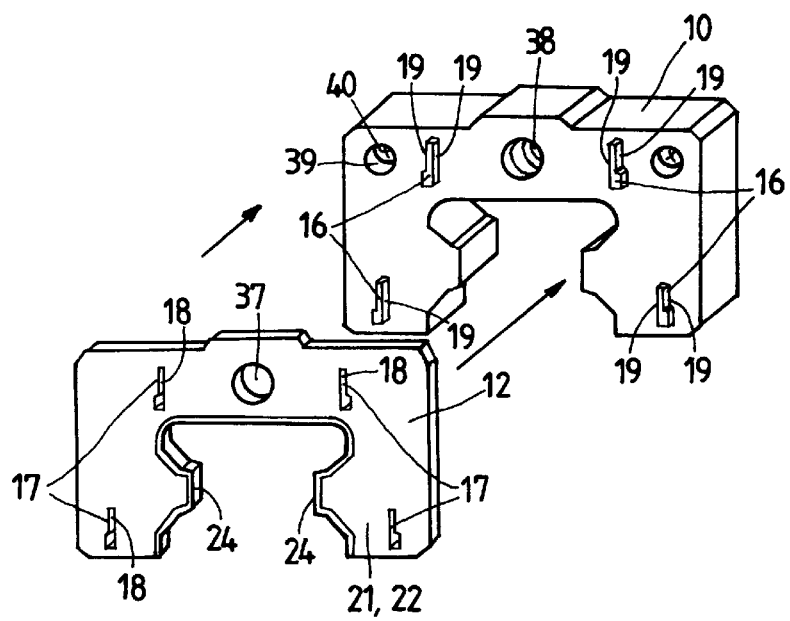
FIG. 2 is an exploded perspective view showing an end cap and end seal adapted to the linear motion guide unit shown in FIG. 1.
Figure 3:
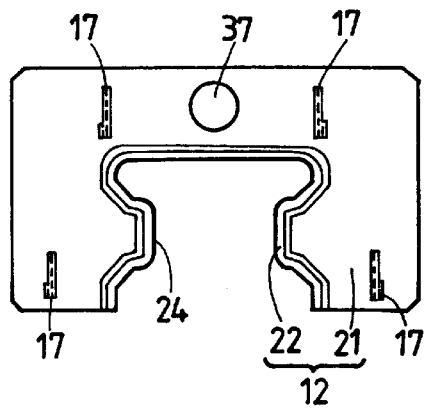
FIG. 3 is a front elevation view of the end seal shown in FIG. 2.
Figure 4:
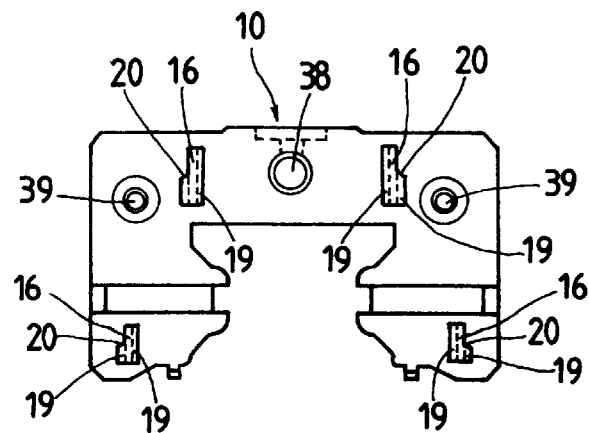
FIG. 4 is a front elevation view of the end cap shown in FIG. 2.
Figure 5:
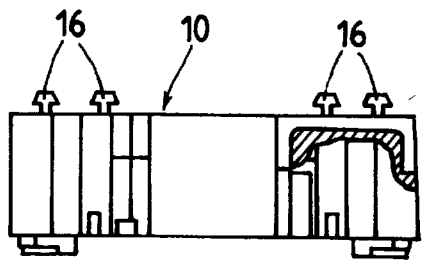
FIG. 5 is a bottom plan view, partially broken away, of the end cap shown in FIG. 4.

Referring now in detail to FIGS. 1 to 12, the linear motion guide unit according to the present invention will be explained below.

Compared with the linear motion guide unit of the prior art in FIGS. 13 to 22, the linear motion guide unit of the present invention is substantially identical in structure, with the exception of mounting structure of the end seals to the end caps. Hence, similar reference characters designate similar elements or components and the previous description regarding the prior art will be applicable.

The linear motion guide unit of the present invention is characterized by the mounting system of end seals 12 to end caps 10. The linear motion guide unit of the present invention primarily comprises the track rail 2 having raceway surfaces 4 on its lengthwise side surfaces 3, and the sliding element, or a slider 6, arranged on the track rail 2 for sliding movement along the track rail 2 by virtue of the rolling elements 5. The track rail 2 is further formed with threaded openings 7 for attaching the rail to a base. The slider 6 is composed of the casing 9 saddling the track rail 2 and having raceway surfaces 8 confronting the raceway surfaces 4 on the track rail 2, the end caps 10 mounted in abutment with the lengthwise opposing ends of the casing 9, one to each end surface, the bottom seals 11 arranged on the lower surfaces of the casing 9 and the end caps 10 so as to make sliding contact with the lengthwise side surfaces 3 of the track rail 2, and the end seals 5 arranged on the end surfaces of the end caps 10 so as to close the clearances between the track rail 2 and the end caps 10.

The casing 9 is formed with the raceway surfaces 8 confronting the raceway surfaces 4 on the track rail 2, and the return passages 13. The rolling elements 5 are held along the raceways defined between the confronting surfaces 4, 8 with retainer bands 15. The end caps 10 are formed with the turnarounds 14 so that the rolling elements 5 may run in a circulating manner through raceways, the turnarounds 14 in the end caps 10 and the return passages 13 in the casing 9. Usually the casing 9 is of metals while the end caps 10 are of synthetic resins and, therefore, the end caps 10 may be secured onto the ends of the casing 9 by means of screws that are driven into the casing 9 through threaded holes 39.

The end seal 12 is made of the combination of the metallic core plate 21 and the elastic sealing member 22 of rubber, plastics adhered to the core plate 21. The elastic sealing member 22 of the end seal 12 is formed with a lip 24 that is capable of making sliding contact with the lengthwise side surfaces 3 and rail head 23 of the track rail 2 so as to air-tightly close the clearances between the track rail 2 and the end caps 10.

The end caps 10, for secure mounting of the end seals 12 on the end caps 10, are each provided on its major surface with protuberances 16, which extend in perpendicular to the major surface and are arranged spaced apart horizontally and vertically from each other. In contrast, the core plates 21 of the end seals 12 are each formed with perforations 17 in correspondence with the protuberances 16 on the end caps 10.

It is to be noted that although FIGS. 1 to 4 illustrate four protuberances and their complementary perforations, the number of the protuberance-perforation pairs does not limited, providing the end seal is reliably held against its associated end cap. As apparent from FIG. 2 or 4, the protuberances 16 are each made longer in vertical direction, compared with its horizontal direction, and provided on its horizontally or widthwise opposing sides with jaws 19 that may be brought into engagement with stopper edges 18, which are formed at the perforations 17 in matching with the jaws 19.

Figure 7:
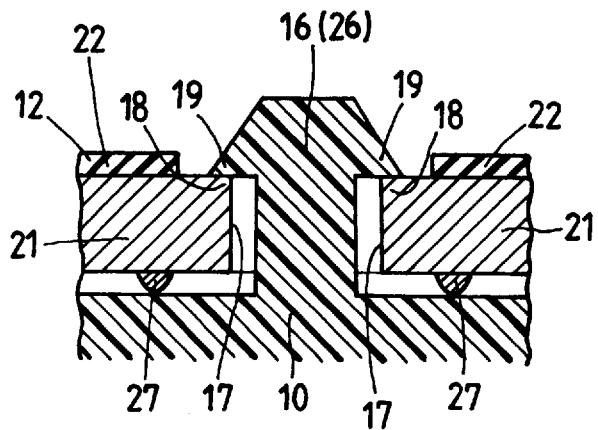
FIG. 7 is an enlarged fragmentary section, taken along the line I—I of FIG. 6, for illustrating a preferred embodiment of the engagement of the end seal with the associated end cap.
Figure 10:
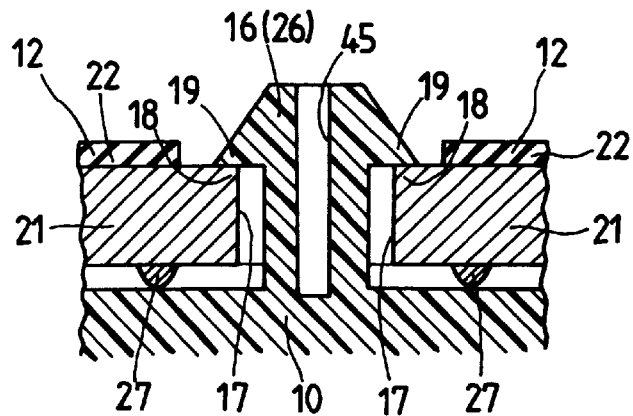
FIG. 10 is an enlarged fragmentary section, taken along the line I—I of FIG. 6, for illustrating another embodiment of the engagement of the end seal with the associated end cap.

The protuberance 16 shown in FIG. 10 is split lengthwise at 45 in a forked configuration rendering its elastic deformation easier, whereas the protuberance 16 in FIG. 7 is of a solid structure. It is preferred for rendering the production process simple to mold the protuberances 16 integrally with the end caps 10. As an alternative, the protuberances 16 may be formed separately and then united with the end caps 10.

Figure 6:
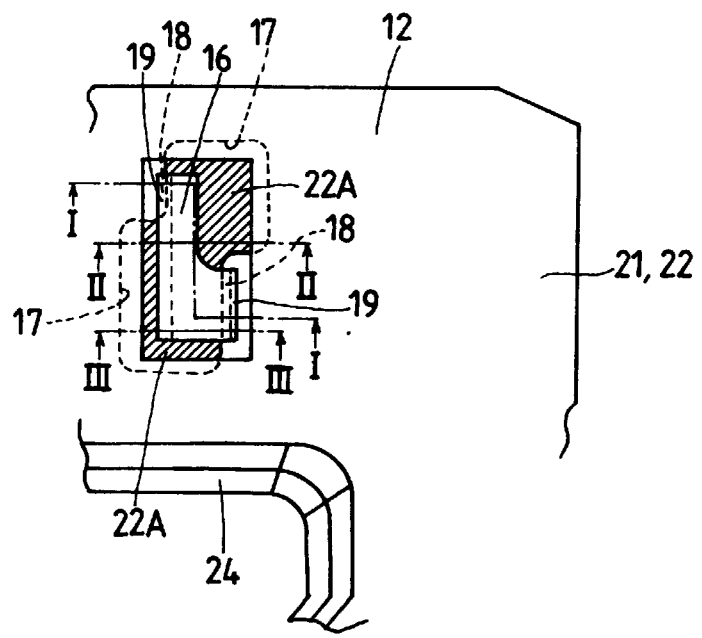
FIG. 6 is an enlarged fragmentary elevation of the end cap taken along the circle A in FIG. 1.

In the design described above, when the protuberances 16 are made of a material resistant to the elastic deformation, it is very hard to fit the jaws 19 into the perforations 17 because the jaws 19 are made greater in the widthwise span than a spacing between the confronting stopper edges 18. To cope with this, as shown in FIG. 6, the protuberances 16 are each made in the configuration easy to deform under pressure while the perforations in the end seal are each formed from upper and lower halves that are offset horizontally with each other. Moreover, the protuberances 16 are each partially cut away together with the associated jaw 19 along its upper half 20 so as to be made less in widthwise direction, compared with the residual lower half.

Figure 8:
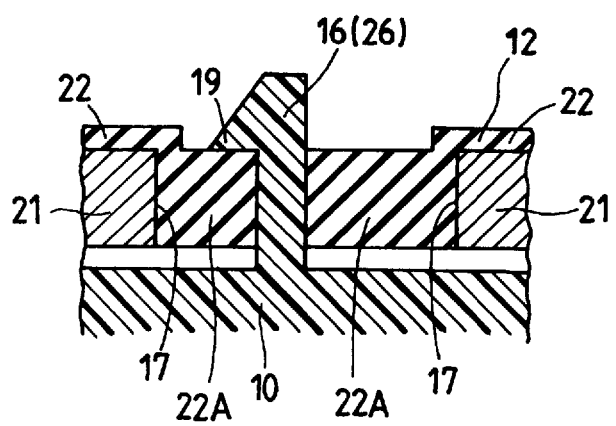
FIG. 8 is an enlarged fragmentary section, taken along the line II—II of FIG. 6, for illustrating a preferred embodiment of the engagement of the end seal with the associated end cap.
Figure 9:
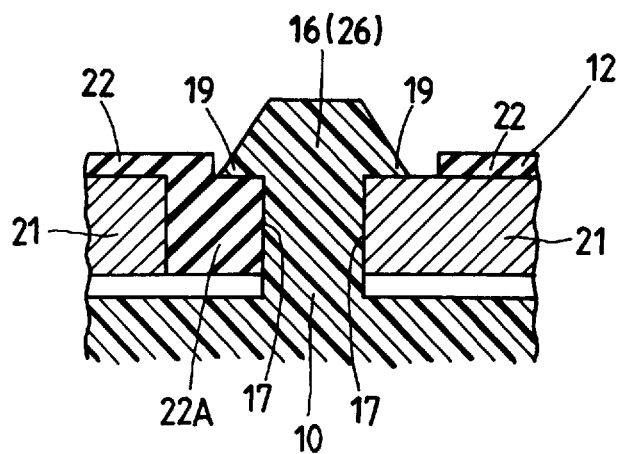
FIG. 9 is an enlarged fragmentary section, taken along the line III—III of FIG. 6, for illustrating a preferred embodiment of the engagement of the end seal with the associated end cap.

Referring again to FIG. 6, the perforations 17 in the end seals 12 are not edged with the stopper edges 18 along the whole contours of the perforations 17, but edged at only the areas that face the jaws 19 of the protuberances 16. Arranged around the perforations 17, as shown in FIGS. 6, 8 and 9, are elastic sealing hems 22A integral with the sealing members 22 to close the clearances between protuberances 16 and the core plates 21. According to the design as described just above, when pressing the end seal 12 against its associated end cap 10 so as to fit the protuberances 16 into the perforations 17, the protuberances 16 are each easily deformed on its reduced half cut away at 20 so as to make the jaws 19 engage with the stopper edges 18 where there is no sealing member 22, whereby the end seal 12 may be easily mounted with one touch operation to its associated end cap 10. It is of course that the detachment of the end seal may be accomplished easily.

As alternative designs for making the protuberances 16 easier to deform lengthwise under the pressure, the protuberance 16, for example, is split lengthwise at 45 in a forked configuration, as shown in FIG. 10, rendering its elastic deformation easier. In addition, each protuberance may be formed from inverted L-shaped pieces, not shown in the drawings, which are disposed back to back, such that the jaws extend outwardly from each other. For locking the protuberance of this type in the perforation, the inverted L-shaped pieces are urged towards each other to be deformed for easy insertion of the protuberance through the associated perforation. Each protuberance may be alternatively formed from inverted L-shaped pieces that are disposed face-to-face each other, such that the jaws extend inwardly towards each other. For locking the protuberance of the latter type in the perforation, the inverted L-shaped pieces are forcibly spaced apart from each other to be deformed for easy insertion of the protuberance through the associated perforation.

The core plate 21 of the end seal 12 is provided on the back surface thereof with elastic projections 27 of the material identical with that of the sealing members 22, which are arranged near the perforations 17. Upon the end caps having been connected to the end seals, that is, the protuberances 16 on the end caps 10 having been fitted in the perforations 17 in the end seals 12 with the result that the jaws 19 have brought into engagement with the associated stopper edges 19, the projections 27 are kept in a press-contact with the associated end of the end caps 10. The end seals are forced so as to space apart from the associated end caps by the reaction force of the elastic projections 27 so that the jaws 19 of the protuberances 18 on the end caps 10 are held in the resiliently engagement with the stopper edges 18 formed around perforations 17 in the core plates 21 of the end seals 19, thus making it possible to help ensure the reliable positioning of the end seals 12 against the end caps 10. The elastic projections 27 may be formed either continuously around the perforations 17 or intermittently along the perforations 17.

The core plates 21 of the end seals 12 are each formed with perforations 17 for receiving therein the protuberances 16 of the end caps 10. The perforations 17 are formed in any shape other than the circle and have the lengthwise linear peripheries along which are the stopper edges 18 that are to be engaged with the jaws 19 of the protuberances 16. Moreover, any one of the end seals is provided at the center thereof with an opening communicated to an aligned opening 38 in the associated end cap 10 and also connected with a grease nipple 35. Grease fed from the grease nipple 35 may be supplied to the raceway surfaces 4, 8, return passages 13 and the like through the opening 38 in the end cap 10, supply line 33 and the turnaround 14.

For easy attachment and/or detachment of the end seals 12 to the end caps 10, it is preferred that the perforations 17 formed in the core plates 21 of the end seals 12 are larger in size than the protuberances 16. Especially, for the positional adjustment in vertical direction of the end seal to the end cap, the perforations are made greater in vertical direction thereof than the protuberances 16.

Although there are clearances between the protuberances 16 and the perforations 17 of the core plates 21, which have been engaged with each other, the clearances may be closed by the sealing hems 22A that are arranged so as to seal around the protuberances 16 and made of the elastic material equivalent with that of the sealing members 22. Consequently, the clearances are kept from the contamination with dust and dirt. In addition, the modification in arrangement of the elastic sealing hems closing the clearances between the perforations 17 and the protuberances 16 results in adjusting the spacing between the track rail 2 and end seals 12, that is, regulating the pre-stress that is to be applied to the lips 24 of the end seals 12, which are made sliding contact with the rail head 23 of the track rail 2.

Figure 11:
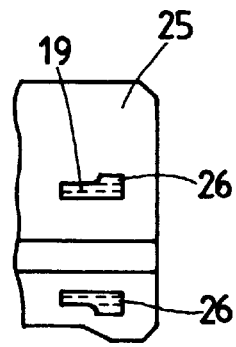
FIG. 11 is an enlarged fragmentary elevation of another end cap applied to another embodiment of the linear motion guide unit according to the present invention.
Figure 12:
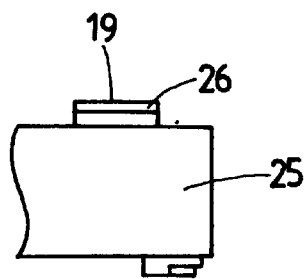
FIG. 12 is a fragmentary bottom plan view of the end cap in FIG. 11.
Figure 13:
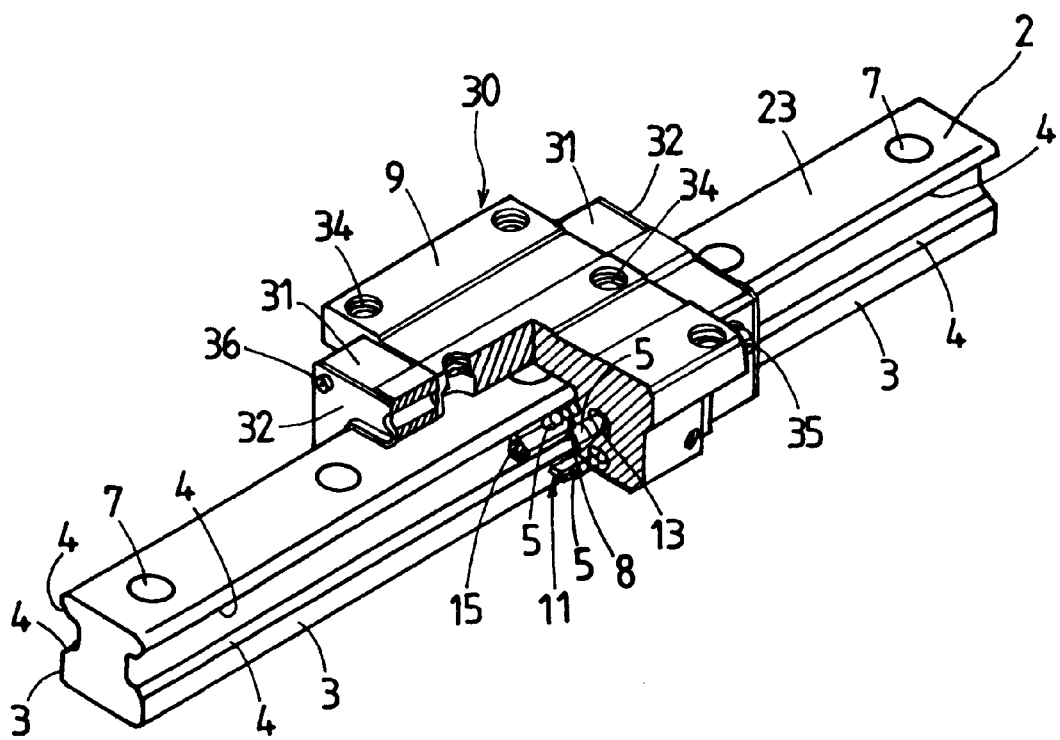
FIG. 13 is a perspective view, partially broken away, showing an exemplary linear motion guide unit of the prior art.
Figure 14:
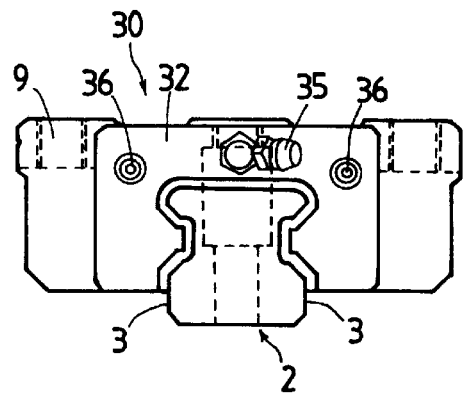
FIG. 14 is a front elevation view of the prior linear motion guide unit shown in FIG. 13.
Figure 15:
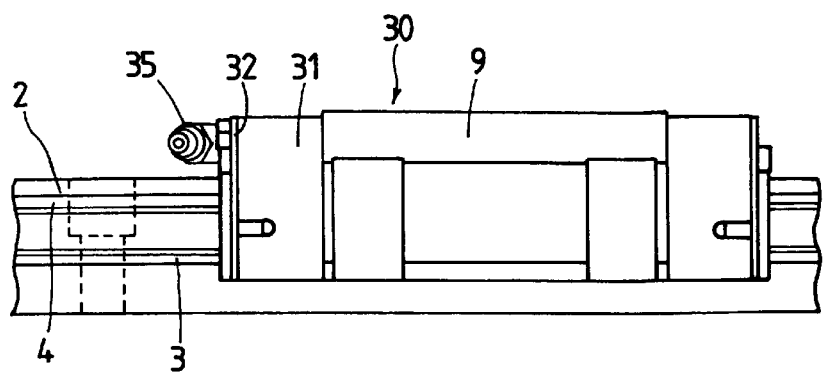
FIG. 15 is a side elevation view of the prior linear motion guide unit shown in FIG. 13.
Figure 16:
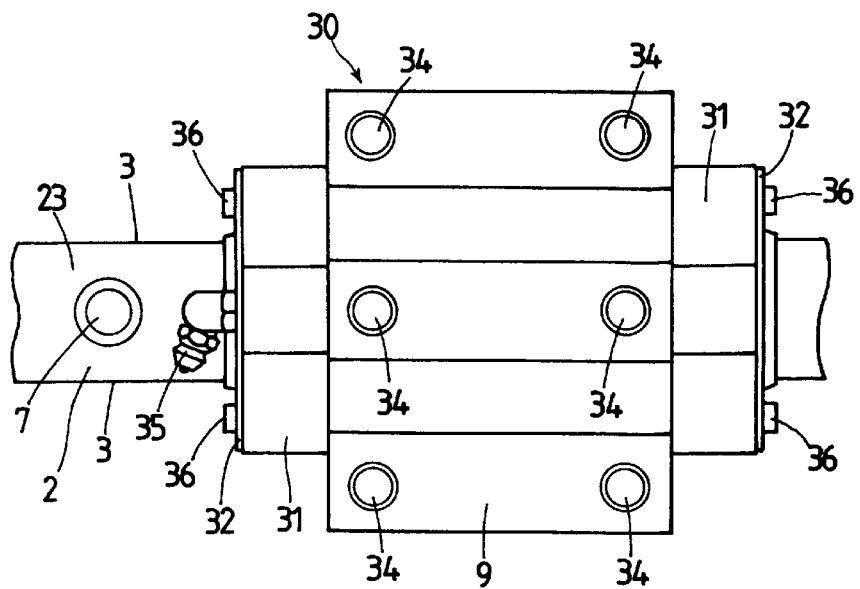
FIG. 16 is a top plan view of the prior linear motion guide unit shown in FIG. 13.
Figure 17:
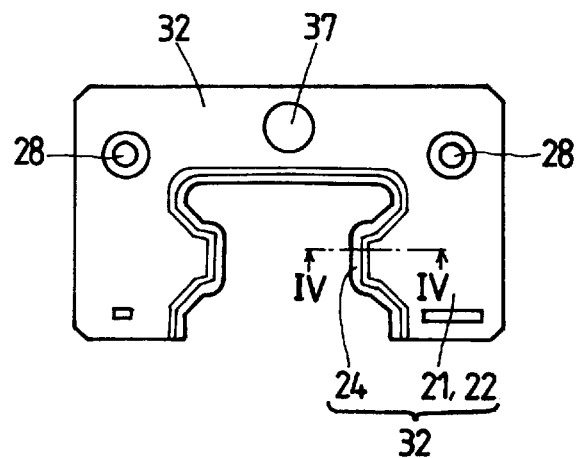
FIG. 17 is a front elevation of a prior end seal.
Figure 18:
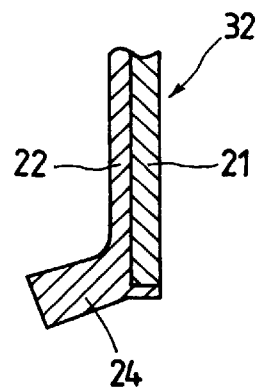
FIG. 18 is a fragmentary section of the prior end seal taken along the line IV—IV of FIG. 17.
Figure 19:
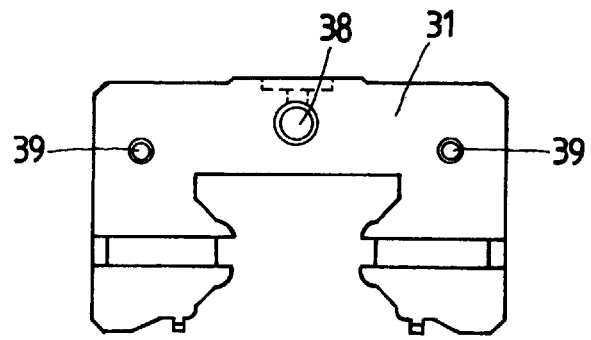
FIG. 19 is a front elevation of an end cap incorporated in the prior linear motion guide unit shown in FIG. 13.
Figure 20:
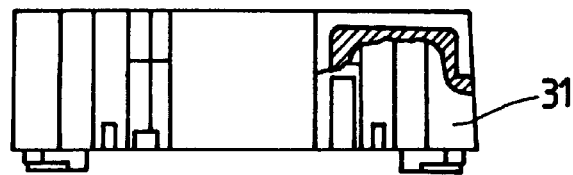
FIG. 20 is a bottom plan view, partially broken away, of the prior end cap shown in FIG. 19.
Figure 21:
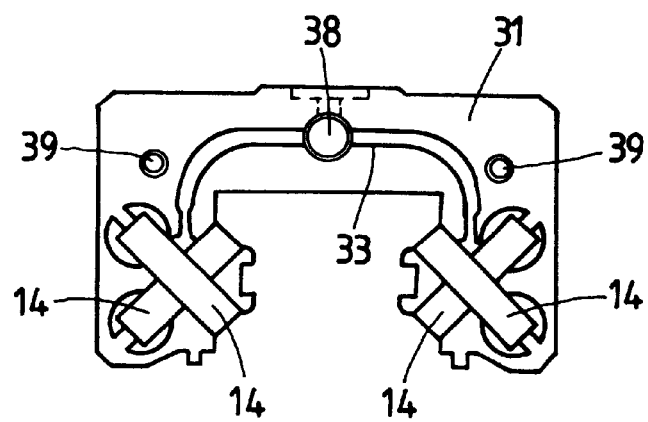
FIG. 21 is a rear elevation view of the end cap shown in FIG. 19.
Figure 22:
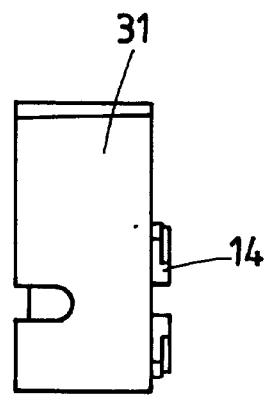
FIG. 22 is a side elevation view of the end cap shown in FIG. 19.

Shown in FIGS. 11 and 12 are another type of four protuberances 26, which are designed to extend horizontally in parallel with the railhead 23 of the track rail 2. It is to be noted that four perforations, not shown, in the end seals are also designed to extend horizontally in compliance with the protuberances 26. The perforations of this design are made longer in horizontal length than protuberances 26 for easy positional alignment in horizontal direction.

While the present invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A linear motion guide unit comprising:

a track rail having first raceway surfaces on its lengthwise side surfaces and a sliding element saddling the track rail for a sliding movement with respect to the track rail;

the sliding element including a casing having second raceway surfaces confronting the first raceway surfaces of the track rail, end caps mounted on the casing at opposing ends lengthwise the casing, rolling elements running along raceways defined between the first and second raceway surfaces, and end seals arranged on end surfaces of the end caps;

the end caps being provided on the end surfaces thereof with integrally formed protuberances; and the end seals being composed of core plates formed with perforations to make engagement with the protuberances of the end caps, and sealing members adhered to the core plates so as to close clearances between the track rail and the end caps.

2. A linear motion guide unit constructed as defined in claim 1, wherein the protuberances on the end caps are each formed so as to extend vertically of the end caps at its lengthwise direction.

3. A linear motion guide unit constructed as defined in claim 1, wherein the protuberances on the end caps are each formed so as to extend horizontally of the end caps at its lengthwise direction.

4. A linear motion guide unit constructed as defined in claim 1, wherein the protuberances on the end caps are arranged at least four locations spaced apart horizontally and vertically from each other.

5. A linear motion guide unit constructed as defined in claim 1, wherein the perforations in the end seals are made greater in lengthwise direction than the protuberances on the end caps for easy positional alignment of the end seals to the end caps.

6. A linear motion guide unit constructed as defined in claim 1, wherein the core plates of the end seals are provided with elastic projections that are brought into elastic abutment against the end surfaces of the end caps.

7. A linear motion guide unit constructed as defined in claim 1, wherein the protuberances on the end caps are made of a material identical with that of the end caps and formed integral with the end caps.

8. A linear motion guide unit constructed as defined in claim 1, wherein the protuberances on the end caps have jaws that are made into resilient engagement with stopper edges formed along peripheries of the perforations in the end seals.

9. A linear motion guide unit constructed as defined in claim 1, wherein the protuberances on the end caps are partially cut away along lengthwise direction to reduce in widthwise thickness.

10. A linear motion guide unit constructed as defined in claim 1, wherein the protuberances on the end caps are split lengthwise in a forked configuration rendering the elastic deformation easier.

11. A linear motion guide unit constructed as defined in claim 1, wherein the protuberances on the end caps are each made thicker in width along its upper half, compared with the residual lower half.

12. A linear motion guide unit constructed as defined in claim 1, wherein the perforations in the end seals are provided with elastic members to close clearances between the perforations and the protuberances.

* * * * *